Patented Jan. 25, 1938

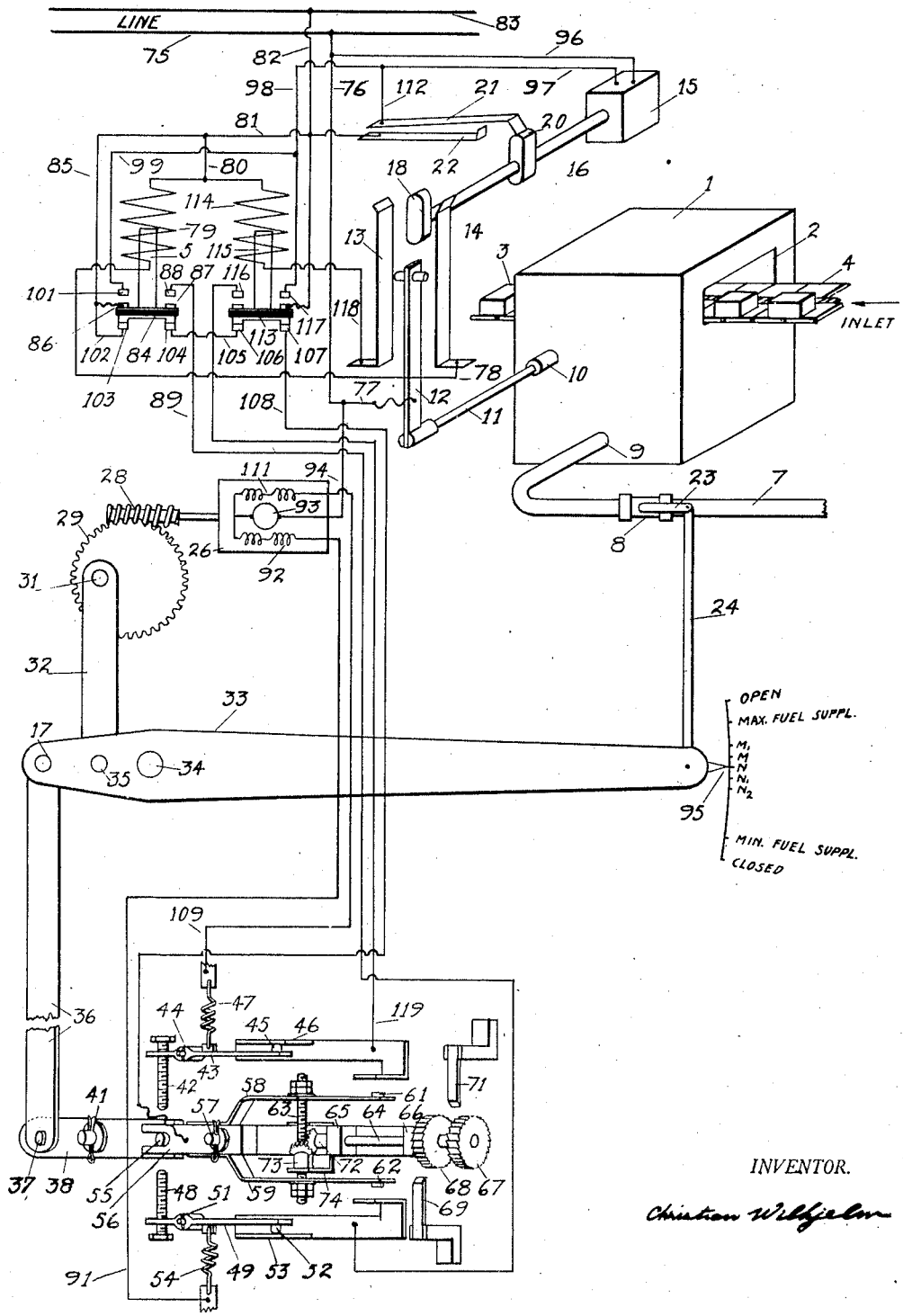

2,106,262

UNITED STATES PATENT OFFICE 2,106,262

AUTOMATIC CONTROL SYSTEM

Christian Wilhjelm, Philadelphia, Pa., assignor, by mesne assignments, to Automatic Temperature Control Co., Inc., Philadelphia, Pa., a corporation of Pennsylvania Application April 2, 1932, Serial No. 602,684

2 Claims. (Cl. 236—15)

My invention relates to an improvement in automatic control of physical conditions such as temperature, pressure, humidity, chemical mixtures, etc. It is particularly designed to be used where such conditions can be measured by instruments capable of causing the closing of two or more electric contacts in response to the plus and minus variation of the condition and where it then is required to move a valve, damper or other mechanical contrivance to restore the condition to a required normal state. In this description, I particularly refer to my invention in use for temperature control, but the features embodied in this invention are as advantageous for many other control applications as well.

Practically all present control systems operate on one of three principles and each of these three principles are applicable to a certain field of control problems, but there is one certain kind of control problem that neither of these three above mentioned systems can fully take care of in a manner satisfactory to the trade in general. This particular invention is made for the purpose of filling this empty gap in the present known art of control.

In order to fully judge the new features as well as the scope of this invention, I believe it will be necessary to state the present art of control briefly.

The first and simplest principle of control is to have a thermometer with two electric contacts on either side of the control pointer and as the temperature rises or falls, either of those two contacts are made. The circuits so made are utilized to either open or close the fuel valve to such positions that there can be no doubt that the temperature will turn back to the control point. The constant opening and closing of the fuel valve will cause the temperature to hunt up and down in response to the valve fluctuations. If there is little time lag, this type of control will give fairly good temperature regulation, but if there is a considerable time lag in between the time the valve changes and until such change shows upon the thermometer, the temperature will have a tendency to swing up or down a long time after the correcting contact has been made, therefore making it impossible to get very close control. One other disadvantage with this control system is that it causes a constant pulsation of combustion, regardless of whether or not variations in fuel requirements actually are required. Controllers built on this principle, therefore, are limited to installations having very slight variation in fuel requirement and therefore requiring very small difference between the maximum and minimum fuel supply. As an example, if 90% of the fuel to a furnace can be kept on constantly, the control valve will only need to open or close for 10% of the fuel in order to maintain the temperature swinging within a few degrees above or below the desired temperature. Under such conditions, the effect of time lag is slight as well as the effect of the pulsating fuel supply. There is, however, a definite requirement for controllers that will not only regulate the temperature within narrow load changes of 10% of the total fuel supply, but will also maintain the desired temperature at any time when the load conditions are such that 30, 40, 50, 70 or 100% of the fuel supply is required must be cut off to maintain the desired temperature.

There now exists on the market two different types of controllers for the above conditions out of which only one type is capable of actually handling more than one load condition without manual adjustment. The other system is founded on erroneous principles and can only take care of one condition without manual attention.

The first system consists in having one or more contacts on the high or low side of the thermometer pointer and have these contacts cause the valve to operate in steps towards open or closed position, either continuously or at different rates in intermittent steps of motion, thereby making it possible gradually to readjust the fuel valve to give the supply of fuel required at any given load condition. In practice, however, this type of equipment is limited in scope because of the time lag, as explained above. It is not practical to make the step movements of the valve at a rate greater than the existing time lag. If the valve movements take place at a faster rate than the existing time lag, the valve movements will overcorrect every time and continue swinging of the temperature and the valve movements will take place with no possibility of attaining a balanced condition even when load conditions are steady. If corrections are made slower than the time lag, then the result is under corrections which will permit the temperature to vary too much on account of insufficient corrections in time to prevent the over-shooting. Such controllers, therefore, are limited to control propositions where the changes from one load condition to another is such that load condition from one extreme to the other does not come suddenly, but gradually over a reasonable period of time so that corrections can be made in successive steps, each time, permitting the effect of the change to determine whether or not a further correction should be made. In other words, each control system can only be used to take care of nominal changes in fuel requirements, or changes that are not too great within one time lag period. Any sudden changes of any magnitude must with such systems be taken care of by an attendant who will close or open an emergency valve by hand when he finds out the controller cannot take care of the changes fast enough.

To overcome this difficulty under certain circumstances, the applicant has invented a control system as described in his application Serial #498,901. This is essentially a combination of the two previous mentioned systems where the last mentioned control principle is functioning to take care of nominal changes and if not quick enough an emergency valve movement of substantial size is added to eliminate the human operator for this work, thus making this equipment entirely automatic.

However, only certain control jobs can be handled with this particular design. The jobs that can be handled are such control jobs where at times very slow changes take place and then suddenly the controller will have to meet a new load condition and remain fairly constant at this new load condition for an indefinite period of time. Then after a time again a sudden load change for an altogether new load condition takes place, followed possibly by still further changes, fast or slow.

There is, however, a distinct type of control applications which cannot very well be handled by either of the methods referred to above, and in general practice on such installations, a third system of control has been applied with part success. As an example of this type of control problem, I will mention a continuous heat treating furnace for steel leaves for automobile springs, because it represents a typical example. In such a furnace, the steel leaves are placed on an endless conveyor and slowly passed through the furnace. If the spring leaves are moved at a constant speed through the furnace, there is very little load change, and if it were not for sudden stops or starts caused by want of material, lunch hour, mechanical breaks, etc., no control would be required, as the fuel valves could be set once for all and maintain a uniform temperature in the furnace (providing the fuel supply pressure is constant).

The principle applied for such a furnace is a principle where the fuel valve is changed directly in relation to the temperature changes. This can be accomplished in several ways and Patent #1,569,994 (Martin) is a fair example of the principle on which such control systems work. In operating successfully under any of these control principles, it is of course, necessary to match the desired temperature with a certain fixed valve position so that when the steady load condition exists, the temperature will remain as desired just as it would if operated by hand. If now suddenly the load to the furnace is stopped, the temperature will suddenly go up and close other contacts, which instantly will move the valve to new positions of less fuel capacity, thereby restricting the rise in temperature as fast as the furnace permits. So long as the furnace remains with no load, the temperature may therefore remain high with the valve in a closed down position, or it may actuate high and low, causing the valve to hunt back and forth between the various steps of opening corresponding with the actuation of the temperature. If, however, the several actuating contacts in the pyrometer are all arranged within the permissible temperature range within which it is desired to maintain the temperature, the problem is partly solved because as soon as the furnace is again loaded up to its previous load condition, the temperature and the valve will shortly stabilize itself at the predetermined balanced fuel and temperature condition. The hunting under the off load position is generally not important and for such jobs having the one fixed load condition to take care of and other unimportant load conditions, where it is less important to maintain a balanced fuel and temperature condition, this type of controller can be used. However, in practice, these ideal conditions seldom exist. In most cases, the fuel pressure or its B. t. u. values change slightly and what is more important, the leaves of automobile springs vary in size a great deal and it is rare that such manufacturers do not alternate from one size of leaves to another several times during a day's run, furthermore, the temperature at which the various springs are to be treated is generally varied somewhat too.

Under those circumstances, it will readily be seen that whenever any of the above changes take place, the interlock between the temperature variations and the valve positions must be changed or the hunting will be perpetual, because the position of the valve implied to it by a given temperature will unavoidably cause the temperature to change, which in turn will effect another valve change and so forth continually, unless the old original load or fuel condition happens to return. In other words, it will be necessary to manually readjust this temperature to fuel valve relation whenever the fuel pressure changes—the fuel value in B. t. u. changes whenever the load conditions change and whenever it is desired to vary the temperature at which the furnace is required to be held. Therefore, where constant load conditions do not exist, such control systems are not able to automatically handle the situation without constant manual readjustments, hence they are not automatic temperature controls in the sense of the meaning of this term.

The control system disclosed in Patent #1,569,994 and explained above will not handle such control situations entirely satisfactorily as stated above for this reason.

When a sudden change from load to no load takes place, its two fuel changing mediums will start right away to close off the valve; the one movement slowly and the emergency fast, and the ultimate result will be a new valve position conforming to the new condition. There will have been a greater overshooting of the temperature than would be the case had the last mentioned system Patent #1,569,994 been used where the valve changes follow without delay the changes in temperature. There will, however, be no hunting as the valve operating mechanism is free to take any position required to maintain the temperature at the control point.

If now suddenly the load is again applied, this type of controller will, as fast as its two valve operating means can do it, return the valve to its original load position. In doing so, however, it will retard this return more than would be the case had the above mentioned control principle Patent #1,569,994 been used where the fuel valve would have been instantly returned to its original position. It will, however, readily be understood that using a principle as disclosed in application Serial #498,901, there will at no time be any hunting or readjustment necessary due to changes of fuel pressure-fuel value, size of spring leaves passed through the furnace, or for resetting of the temperature control point. A control system similar to Serial #498,901 would be the most satisfactory from the point of being entirely automatic, were it not for the fact that in these days of extreme production efficiency requirements of the industries in general, it is objectionable to have to contend with the delay in production that the use of this equipment requires. It requires the passing of dummy spring leaves through the furnace before stopping or when starting until the proper balance of fuel supply and temperature has been reached or a certain amount of spring leaves would be either over or under treated. Such unnecessay delays in production are highly undesirable from an economical point of view and furthermore, such furnaces would not be entirely safe in case of accidental stoppage on account of mechanical breaks in the conveyor system. In such cases, the slow action of these controllers would cause overheating of the spring leaves which were in the furnace at the time.

It will readily be seen from the above that what is required for such furnaces is a control system which will act slow to balance out the above mentioned load or temperature variations which take place during the course of the operation under load and which also will act much faster than the system described above, whenever the loading of the furnace is suddenly stopped, and then further be able to return the valve position quickly to its old load position to prevent delay in operation as soon as the furnace is again loaded; still further, it must be required of such a control system to temporarily over-adjust the fuel supply whenever a sudden load change takes place and still further be able to readjust the valve position should it so happen that when the furnace was off on no load, it is caused to operate at a different load condition than previous when again started up under load.

I have given the above lengthy explanation to point out the usefulness of this invention as I fail to find any printed publication or publications where the scope and limitations of automatic controls are clearly explained. Practically all existing patents on such apparatus makes it appear that their usefulness is unlimited in scope, thereby beclouding the whole art of automatic control so that no one familiar with the art really has a clear conception of what constitutes new and useful invention over prior art.

My invention, therefore, refers to such a control system that will successfully handle furnaces, controls, etc. where conditions as last described exist.

And the following detailed description of a particular practical embodiment of my invention is so chosen that it combines and utilizes the various principles, combinations and sub-combinations hereinafter set forth and defined by the terms of the appended claims.

Referring to the drawing:

The figure is a diagrammatic illustration showing the complete invention including a furnace to be controlled, a fuel supply pipe, the controlled valve in the fuel supply line, the valve operating device and wiring diagram including relays to function the valve operating device, as well as the temperature measuring instrument and its electric contact construction.

In the figure, a furnace 1 is shown having two openings, 2 and 3 through these openings an endless steel belt 4, passes. Only those portions of this endless belt which are at the entrance and exit to the furnace, 15, are shown for simplicity. To complete the conveyor unit, the exit opening of the furnace, the conveyor belt may pass under the furnace on rollers, one of which has teeth that grips the belt, and this roller is driven at a steady rate by means of an electric motor or other power generator means. As this is common well known construction, I have omitted all these details in the drawing. For illustration of passing load, the square boxes on the conveyor belt illustrate metal parts for heat treatment. 7 represents the fuel supply pipe and 8 the regulating valve in the supply pipe; 9 represents the burner inlet to the combustion chamber of the furnace. 10 represents the temperature responsive element which turns the rod 11 anti-clockwise when the temperature drops in the furnace and clockwise when the temperature rises in the furnace. To the outer end of this rod 11 is fastened a contact member 12. 13 and 14 represent the low and high contacts respectively, in between which the contact pointer 12 oscillates in response to temperature changes in the furnace. 15 represents a small motor unit having a slow speed shaft, 16, extending in between the upper ends of contacts 13 and 14. This shaft 16 carries a cam 18 located right in the gap between contacts 13 and 14. This cam 18 is so dimensioned that as shaft 16 rotates, the cam 18 will alternately push contact 13 or 15 out of its original position once each revolution. On the shaft 16 is also located a cam 20, so located in relation to cam 18 and contact member 21 that this contact 21 is lifted up out of contact with contact arm 22 when cam 18 is half way between either contacts 13 and 14. 23 is the operating lever on the fuel control valve and 24 is a connecting link between the valve operating mechanism. 26 represents a double field reversible motor having an extending shaft on which is fastened a worm 28, which engages worm gear 29 carrying a crank pin 31. A link 32 connects this crank pin with the one end of the operating lever 33 at 35. This operating lever 33 is pivoted at 34 and the other end of this operating lever connects with link 24. It will, therefore, readily be seen that as the motor 26 operates the worm gear 29 one way or the other, operating lever 33 will oscillate back and forth and impart opening or closing motions to fuel valve 8 through link 24 and valve arm 23. Pivoted at 17 is link 36 which connects at 37 with the limit switch operating arm 38. The limit switch operating arm 38 is made of insulated material and this arm swings around a pivot at 41. With the upper side of this insulated arm 38, screw 42 will engage when this end of this switch arm 38 is swung upward. This screw 42, threads into a hole in switch arm 43. Switch arm 43 is pivoted at 44 and at the end opposite the screw 42 is fastened a contact point 45. The switch arm 43 is normally held against bracket 46 through the instrumentality of spring 47. The screw 48 threaded into switch arm 49 is so adjusted that it also can engage arm 38 if it swings down. Switch arm 49 is pivoted at 51 and normally held with contact point 52 pressed against contact plate 53 by means of spring 54. The pin 55 engages a slot in metal arm 56. This metal arm is pivoted at 57. On both sides of this metal arm 56 is fastened identical spring leaf contact arm 58 or 59 respectively carrying contact points 61 and 62. The two contact springs are tied together by a screw 63 which extends through free holes in both arms 58 and 59. The heads on either end of screw 63 restrict the distance between the two contacts although this distance can be less if one of the contacts are pushed towards the center arm 56. This is made possible because the holes through arms 58 and 59, through which the screw 63 extends, are large enough to permit these contacts to spring inward towards the center arm 56. Sixty-four is a rotating shaft which turns in the two bearings 65 and 66. At its outer end this shaft 64 has mounted two ratchet wheels 67 and 68. These two wheels are so placed that if the outer end of arm 56 is swung downward, the ratchet wheel 68 will engage the metal pawl 69 and if the arm 56 swings upwards, ratchet wheel 67 will engage pawl (71). The relation between these parts is such that when switch arm 56 oscillates downward from a mid-position, pawl 69 will push ratchet wheel 68 clockwise, one tooth each time. If the switch arm 56 oscillates upward from a mid-position, ratchet wheel 67 will be turned anti-clockwise, one tooth each time, and as 67 and 68 are fastened to shaft 64, it will turn accordingly and so will the bevel gear 72 fastened to its opposite end. This bevel gear 72 engages another bevel gear 73. This gear has a threaded center hole and it turns on the screw 63; it is prevented from side movements by the bracket 74 and the teeth in bevel gear 72. It will, therefore, readily be seen that a constant oscillation downward of arm 56 will cause this gear 73 to turn anti-clockwise and as the screw 63 has right hand thread, it will be pulled up through the thread in the gear 73, causing the contact 59 to be pulled closer towards arm 56 and incidentally permit contact 58 to move away from contact arm 56. Exactly the reverse action will take place if the switch arm 56 is oscillated upward from a mid-position. The remaining parts consist of relay coils with armatures and contacts as well as lines indicating wires. All those items are standard and well known and not described in detail. They are, however, all numbered in rotation and referred to below when describing the operation.

The operation is as follows:

If the temperature of the furnace 1 is as desired, the thermostatic contactor 12 will remain in a neutral position half way between contacts 13 and 14. With 12 in that position, everything will remain stationary in the positions in which shown in the figure.

As load conditions of the furnace change, the temperature may change four different ways. It may change slowly, either to a higher or a lower temperature as a gradual increase or decrease in load is effected. The temperature may change rather suddenly up or down, because the load through the furnace is suddenly stopped or started. In either case, this equipment will function to prevent substantial variation of the temperature, but in each case it will do so in the manner most appropriate for the particular condition change.

I will first assume that a lighter load is gradually passed through the furnace and that for this reason, the temperature in the furnace is creeping up. Contact arm 12 will engage contact spring 14. In so doing, the following electric circuit is closed; from line 75, through wires 76 and 77 to contact arm 12, to contact 14, wire 78, relay coil 79, wires 80, 81 and 82, and back to the other side of the line 83. The current through coil 79 will cause iron core 5 to be pulled upward carrying with it the contact carrying armature 84. This new position of armature 84 will cause the closing of two separate electric circuits.

First the following:

From line 83, wires 82, 81 and 85 to contact 86 across to contact 87 up through contact 88, through wire 89 to contact bracket 53, through contact point 52, switch arm 49, spring 54, wire 91, through motor field coils 92, motor armature 93, wire 94, and wire 76 back to line 75. This circuit will start motor 26 running in a direction causing worm gear 29 to turn clockwise. In so doing, pivot 31 will move upward in the drawing and through link 32, cause the operating lever 33 to follow. Pivoted around 34 the outer end of lever 33 will swing downward. This movement through link 24 and lever 23 causes the fuel valve 8 to close off the fuel to the furnace. The mechanical construction is so proportioned that as worm wheel 29 turns about 90° from its shown position, the outer point 95 of lever 33 has reached to position marked "minimum" fuel supply. Likewise link 36 connected to lever 33 at 17 has pulled switch lever 38 up with its outer end and down with its inner end so that its lower side engages screw 48 and thereby turns contact 52 away from contact plate 53, thus breaking the established circuit through the motor 26, causing it to stop.

With the switch arm 38 down against screw 48, the center switch arm 56 has also taken a new position as follows:

Point 55 being pushed downward, the whole section of arm 56 on the other side of its pivot point 57 will be swung upward so that point 61 will engage contact plate 46 and pawl 71 a tooth on ratchet wheel 67. This last mentioned push of pawl 71 to wheel 67 causes a slight anti-clockwise turn of shaft 64 with bevel gears 72 and 73 also moving. The turn of gear 73 would be clockwise and as it is locked stationary itself, the screw 63 will move downward slightly forcing contact 61 closer to the arm 56 while the downward movement at the same time permits contact 62 to move further away from arm 56.

A second electric circuit is also established as follows:

From line 75, wire 96, motor 15, wires 97, 98, and 99, contact 101, contact 86, and wires 85, 81 and 82 back to line and wire 83. This circuit will cause motor shaft 16 to revolve so long as a circuit is closed through coil 79 or as long as the temperature in the furnace registers high. However, as the shaft 16 revolves, the cam 18 will once in each revolution push contact 14 away from its engagement with the contact on arm 12. When this occurs, it is evident that the circuit first traced that maintained armature 84 in its upward position is broken and the armature 84 will return to the position shown in the drawing. With 84 in this position, the following circuit will be established. Line 83 to wires 82, 81, 85 and 102, contacts 103 and 104, wire 105, contacts 106 and 107, wire 108, switch arm 56, flexible arm 58, and contact 61 to bracket 46, spring 47, wire 109, motor field 111, armature 93, wire 94, 76 back to line through 75. This circuit through the motor 76 will cause it to operate in the opposite direction from before, so that the worm gear 29 will move counter-clockwise, tending to move crank pin 31 back towards the position in which it is shown. As this motion takes place, it is evident from previous explanation of the lever movement that pointer 95 moves upward on the drawing from the position marked minimum towards the position in which it is shown. Likewise, link 36 will push switch lever 38 towards the position shown and this motion will eventually cause contact 61 to break contact with bracket 46 and when that happens this now established circuit will be broken and the switch will be restored substantially as shown in the drawing with the exception, though the breaking took place a little sooner because of the above explained ratchet shift of contact point 61. Due to this, it is evident the motor would stop just a little earlier with the result that point 95 of lever 33 did not reach back to N, but $N_1$. It will be noticed, that the dropping of the armature 84 also breaks the established circuit to motor 15, but an auxiliary circuit is continuing the movement of this motor 15 as follows. Line 75, wire 96, motor 15, wire 97, wire 112, contacts 21 and 22, wire 82 and line 83. From the mechanical design it will be readily seen that whenever the cam 18 is not in the position shown, cam 20 does not lift contact 21 off contact 22, hence making the above described circuit possible, as therefore, shaft 16 continues to revolve notch 18 will eventually disengage with contact 14 and if when so doing, the temperature is still high, the first mentioned circuit through contacts 12 and 14 will again be established and relay armature 84 be pulled up. This will again cause motor 26 to operate lever 33, to the minimum fuel position just as before, resulting in the breaking of contact at 52, the closing of contact at 61 and the engagement of pawl 71 with ratchet wheel 67. The latter movement causing an additional downward shift of contact arm 58 and point 61, motor 15 continuing its operation will eventually again cause cam 18 to engage contact 14 and break the operating circuit so that armature 84 again drops out. The previous explained circuit, through the back relay contacts and contact 61 and bracket 46, will again be established, causing a return movement of the controller parts towards the original position in which it is shown on the drawing. However, this second line due to the ratchet movement contact 61 will still break earlier causing the motor to stop still earlier so that the fuel valves are only returned to the position $N_2$ as now the motor shaft 16 turns and again disengages contact arm 14. It may be assumed that the reduction in fuel, thus effected momentarily and permanently has been sufficient to restore the temperature to the desired point and no further change will be effected as contact 12 will not any more contact 14. It is, however, evident that should further reduction in fuel be required the alternate operation above can be continued until the return position of lever 33 is almost equal to the minimum fuel supply which is a point determined by test to be one beyond which it is unsafe to reduce the fuel supply. The speed at which shaft 16 turns should be determined by the time lag of the furnace. That is, there should be sufficient time in between each oscillation of the valve that the effect of the resulting fuel change will have time to affect the thermostat before any further operation takes place.

The exact counterpart in operating means exists if the loading conditions change to require more fuel. In that case, contact pointer 12 will indicate too low temperature by swinging over and closing contact with contact arm 13. This closes a circuit as follows: Line 75, wire 76, 77 and contact arm 12, contact 13, wire 118, coil 114, wires 80, 81 and 82 to line 83. This circuit will cause coil 114 to pull up armature 113. In so doing, the following circuit is established. From line 83 to wire 82, upper section of armature 113, contact 116, wire 119, contact bracket 46, contact 45, spring 47, wire 109, motor field 111, armature 93, wire 94, 76 and line 75. This circuit will cause motor 26 to operate to move worm wheel 29 and crank pin 31 downward from position shown. This movement through link 32 will move point 95 on lever 33, upward, increasing the opening of fuel valve 8. For purpose of illustration, the maximum opening will be represented by the so marked point on the graduated scale in front of point 95. As the movement here has been completed, lever 36 is assumed to have pushed the outer end of switch arm 38 far enough down that its other end will be raised sufficiently to engage screw 42 and thereby push contact 45 away from bracket 46. As that is done, the operating circuit is broken and everything stops with the increased fuel supply going into the furnace. In the meantime the circuit to the motor 15 has also been established as follows. From line 83, wire 82, contact 117, wire 98, 97, motor 15, wire 96 and line 75. As it operates, it will eventually cause cam 18 to push contact 13 outward and break its contact with arm 12. As this is accomplished, the original circuit is broken and armature 113 is returned to the position in which it is shown.

While arm 38 holds contact 45 away from contact plate 48, it will also have swung the center arm 56 around its pivot 57 to a position where contact 62 will contact bracket 53. It will also be in a position where pawl 69 will engage a tooth in ratchet wheel 68. This movement will cause shaft 64 to turn clockwise together with the bevel gear 72, which in turn will move the bevel gear 73 counter-clockwise. Due to the fixed position of gear 73, this movement will result in an upward shift of screw 63. This movement evidently gradually establishes the return of the original relative position of contacts 61 and 62 with relation to the position of arm 56, hence as the interrupter motor now intermittently oscillates, the mechanism returns to its normal center position and off to the maximum. It will readily be understood that the neutral mid-position will continue to change from $N_2$ to $N_1$ to N and still further to M or $M_1$ until a position has been reached where the fuel supply about balances the fuel demand.

It may be assumed that at one time or another the conveyor is suddenly stopped and therefore suddenly none or very little heat will be required in the furnace. For that reason, it is absolutely essential to reduce the fuel supply to a minimum right away and make sure temperature does not increase very much above the holding point ruining the work already in the furnace. To illustrate this condition, contacts 13 and 14 are assumed to be very flexible so that they will push away readily as pointer 12 presses against them. Hence, should the above mentioned sudden stoppage of the conveyor take place and the furnace temperature begin to rise rapidly, then 12 engages contact 14, which as explained above causes the apparatus to function and instantaneously cut the fuel off to the very minimum. Still the temperature will be found to build up slightly which will cause 12 to push contact 14 outward so that when cam 18 comes around to cause the routine breaking of the circuit between 12 and 14, contact 14 is bent out of its reach and consequently no oscillation back and forth takes place, and the fuel supply remains at the very minimum until equilibrium has been established and all the stored up heat has been dissipated. After such a sudden stop, usually there follows an equal sudden start which will require just as drastic action in the opposite direction, if there is not to be a great slump in the temperature with unavoidable improper treatment of the work.

This control equipment, however, will perform the very essential fuel changes as required. As soon as the conveyor starts up, the cold work entering will begin to draw heavily on the heat in the furnace. This will suddenly cause the temperature to begin to drop and as 12 makes contact with 13 instantaneously the apparatus will function and move the fuel valve to its maximum open position and the dropping off of the temperature caused by a sudden start up is reduced to the very minimum. Due to the general tendency for the temperature to drop somewhat more than usually under such circumstances, contact 12 will push contact 13 away a certain amount so that when cam 18 comes around it will not be able to break the connection between 12 and 13, hence does not start the oscillating movement and for a while full and undisturbed maximum fuel will be added to the furnace to reduce the temperature drop to a minimum as the furnace builds up the heat required to maintain the load continuing at a more steady rate. This excessive fuel supply is not required any more and the temperature rises and contact between 13 and 12 is again broken and the fuel valve is returned to a position exactly where it had balanced itself off before the sudden stop with the following start had occurred. It is, therefore, possible by this control system to take care of sudden changes in operating conditions without necessarily disturbing the operating balance between fuel demand and fuel supply, unless such change is absolutely necessary in which case the oscillation of the apparatus will set in until this new balance has been established.

Where the time lag in the furnace is very short, the operation of motor 15 and its cam 18 can be eliminated as each departure to either extreme of the fuel supply will quickly cause a change in temperature, causing the oscillation which will change the normal mid-position.

Having now described my invention what I claim as new and desire to secure by Letters Patent is:

1. In a system of a furnace temperature regulator operating on a fuel supply, a valve in said fuel supply, a motor operating said valve and controlled in its movements by a limit switch consisting of two outside fixed switch contacts and a center ratchet operated floating normal contact assembly, electric contacts responsive to temperature changes in the furnace, electric relays wired to an interrupter operative in response from the temperature responsive contacts in combination with electric inter-wiring to operate through said limit-switch, the said motor and valve, the system arranged to subject the valve to cycles of oscillations, the ratchet contact assembly operative to vary the effective length of strokes of each part of a cycle.

2. In a temperature control apparatus having a temperature responsive member, electric contacts operable by said member in response to temperature changes, means for conveying heat and controlling mechanism for regulating said means for conveying heat operable by said electric contacts, an electric motor operating both said controlling mechanism and a limiting switch, operating means between said motor and said switch incorporating two extreme limiting switch arms and contact springs for maintaining said limit switch arms in normally closed position against their respective contacts, between these arms, a centrally located oscillable contact carrying switch member able to contact right or left with the extreme switch contacts, ratchet operated adjusting means co-operating with the contacts on this oscillating switch member and operative during oscillation in one direction, thereby readjusting the position of said contacts and said controlling means relative to the outside limiting switch arms.

CHRISTIAN WILHJELM.